United States Patent
Ishikawa (10) Patent No.: US 7,397,211 B2
(45) Date of Patent: Jul. 8, 2008

(54) MOTOR CONTROL APPARATUS

(75) Inventor: Satoru Ishikawa, Ryugasaki (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 11/469,778

(22) Filed: Sep. 1, 2006

(65) Prior Publication Data

US 2007/0075658 A1    Apr. 5, 2007

(30) Foreign Application Priority Data

Sep. 9, 2005   (JP) .............. 2005-262975

(51) Int. Cl.
*H02P 1/00*   (2006.01)
*H02P 5/00*   (2006.01)
*H04N 5/335*  (2006.01)

(52) U.S. Cl. .................. 318/460; 318/85; 318/162; 416/34

(58) Field of Classification Search ............ 318/85, 318/138, 254, 439, 258, 463, 244, 603; 416/34
See application file for complete search history.

(56) References Cited

U.S. PATENT DOCUMENTS

| | | | | |
|---|---|---|---|---|
| 4,152,734 A | * | 5/1979 | Louth ................. | 360/70 |
| 4,438,377 A | * | 3/1984 | Sakai et al. ............ | 318/254 |
| 5,209,116 A | * | 5/1993 | Okumura ............... | 73/462 |
| 5,221,185 A | * | 6/1993 | Pla et al. ............... | 416/34 |
| 5,237,618 A | * | 8/1993 | Bethel ................. | 381/71.2 |
| 6,326,757 B1 | * | 12/2001 | Aoki et al. ............ | 318/599 |
| 6,570,350 B2 | * | 5/2003 | Ohno et al. ............ | 318/254 |
| 6,850,023 B2 | * | 2/2005 | Lau .................... | 318/463 |
| 2002/0044769 A1 | * | 4/2002 | Ohno et al. ............ | 388/800 |
| 2002/0143450 A1 | * | 10/2002 | Fujimoto et al. ........ | 701/43 |
| 2007/0075658 A1 | * | 4/2007 | Ishikawa .............. | 318/85 |

FOREIGN PATENT DOCUMENTS

JP    11-299283 A    10/1999

* cited by examiner

*Primary Examiner*—Paul Ip
(74) *Attorney, Agent, or Firm*—Rossi, Kimms & McDowell, LLP.

(57) ABSTRACT

A motor control apparatus includes a first FG pattern for generating a first induced voltage attendant upon rotation of the rotor of a motor; a second FG pattern for generating a second induced voltage due to noise; a differential amplifier for differentially amplifying the first and second induced voltages, which are input thereto; and a motor speed control unit for controlling rotation of the motor so as to achieve synchronization between the output of the differential amplifier and a prescribed frequency signal.

11 Claims, 10 Drawing Sheets

MOTOR CONTROL APPARATUS

BACKGROUND OF THE INVENTION

1. Field of the Invention

The present invention relates to a motor control apparatus for controlling rotation of a motor such as a brushless motor.

2. Description of the Related Art

The market is seeing increasing supply of products such as wireless LANs and mobile telephones that use electromagnetic waves as well as a variety of home electric appliances such as TVs and microwave ovens. Radiation noise emitted from these electronic devices is pervasive. In addition, the increasing use of large-scale facilities in plants, factories and offices has led to an increase in power consumption and in the production of radiation noise, and there will be no lessening of radiation noise owing to automation and the spread of personal computers. Furthermore, aging equipment is fast becoming a source of unnecessary radiation noise.

If new equipment is introduced under such conditions, the electromagnetic noise it will be subjected to is incalculable. In order to deal with this, the nations of the EC have taken the initiative and clarified methods and standards of immunity specifications as by the EN standard (EN55024/1998) put in the form of a recommendation, and this has become a standard for evaluating the performance of equipment. Further, there is increasing debate at various facilities such as ITU-T and CISPR, which are facilities that establish international standards. In particular, the CISPR (Comite International Special des Perturbations Radioelectriques) deals with the immunity problem through CISPR240.

[reference Non-Patent Document 1]: "Noise Immunity in Information Communication Equipment", published by Corona K.K.

[reference Non-Patent Document 2]: "Boundary Values and Measurement Methods Relating to Immunity Characteristics of CISPR24—Information Technology Devices", published by Science Forum K.K.

Conventional devices are evaluated according to a method compliant with the above-mentioned immunity standard and are provided with noise shields made of well-known metal materials. In addition, circuits are provided with capacitors or choke coils to alleviate the effects of exogenous noise. Further, devices equipped with a conventional brushless motor unit or brushless motor for dealing with changes in the electromagnetic environment are also similarly affected by exogenous noise. As a result, the rotational speed of the motor becomes unstable with regard to the target rpm.

Adding on a noise shield or electronic circuit filter is an example of a technique for preventing malfunction due to noise inflected upon equipment from the outside. A problem with such a countermeasure, however, is an increase in number of parts and a rise in cost.

SUMMARY OF THE INVENTION

Accordingly, an object of the present invention is to solve the problems of the prior art.

Another object of the present invention is to provide a motor control apparatus that is capable of rotating a motor stably by suppressing the effects of exogenous noise while holding down cost.

According to the present invention, there is provided with a motor control apparatus comprising:

a rotation signal generating unit configured to generate a first induced voltage attendant upon rotation of a rotor of a motor;

a noise signal generator configured to generate a second induced voltage due to noise;

a differential amplifier configured to differentially amplify the first and second induced voltages, which are input thereto; and a motor rotation control unit configured to control rotation of the motor so as to achieve synchronization between the output of the differential amplifier and a prescribed frequency signal.

Further features of the present invention will become apparent from the following description of exemplary embodiments (with reference to attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will be described in detail with reference to the accompanying drawings. It should be noted that the embodiments below do not limit the present invention set forth in the claims and that all combinations of features described in the embodiments are not necessarily essential as means for attaining the objects of the invention.

Figure 1:
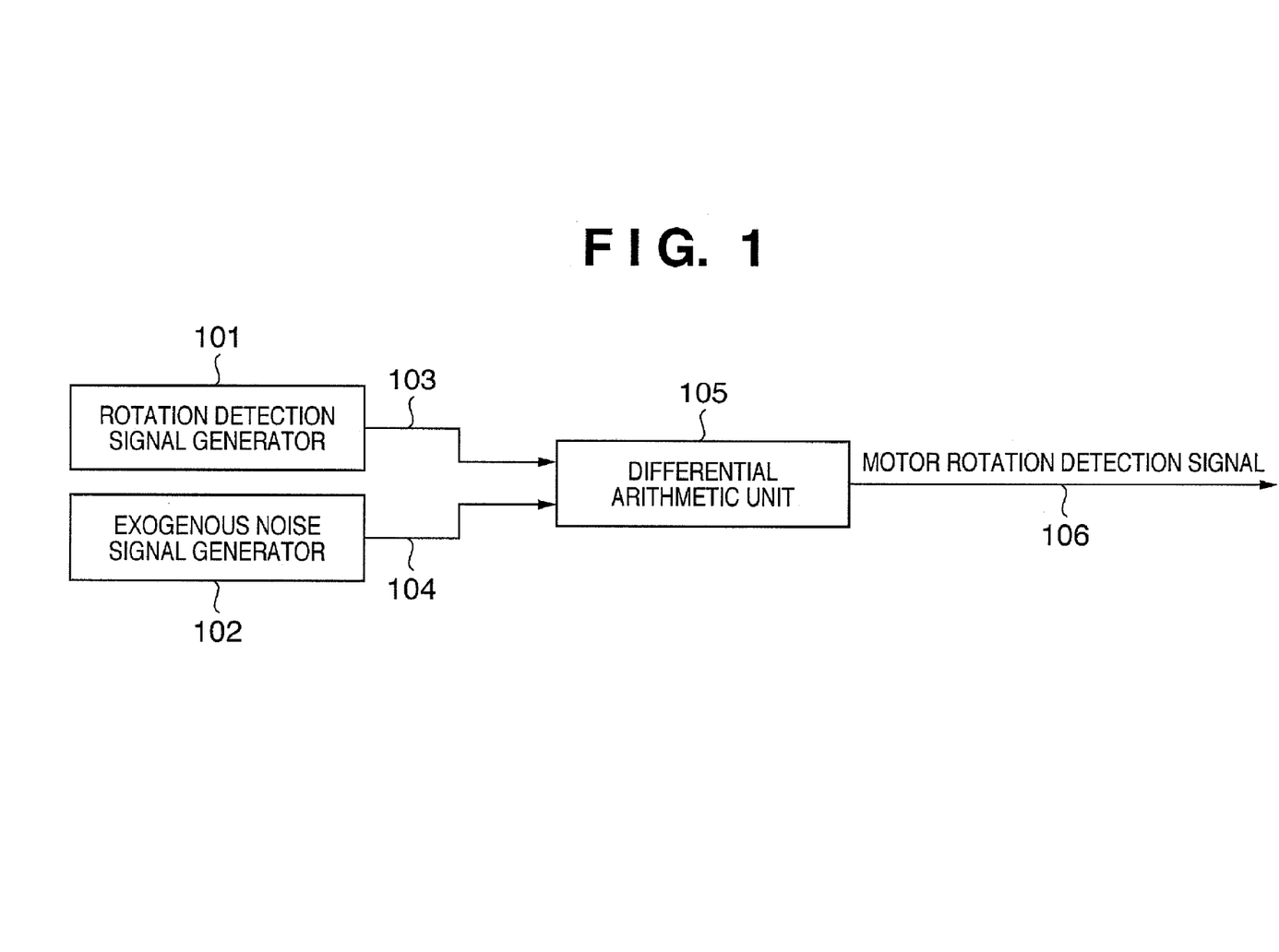
FIG. 1 is a functional block diagram illustrating the functional structure of a motor drive circuit according to a first embodiment of the present invention.

FIG. 1 is a functional block diagram illustrating the functional structure of a motor drive circuit according to a first embodiment of the present invention.

A rotation detection signal generator 101 detects the rotation of a motor and outputs a differential input signal 103. An exogenous noise signal generator 102 detects exogenous noise and outputs a noise component signal 104. A differential arithmetic unit 105 typified by an FG amplifier receives the differential input signal 103 and noise component signal 104 as inputs and outputs a motor rotation detection signal 106. As a result, even if noise not dependent upon motor rotation is impressed upon the device or motor, the noise signal is represented by the noise component signal 104. At this time the exogenous noise component is injected similarly into the FG pattern from the rotation detection signal generator 101 and a signal that is the sum of the FG generation signal and noise component at the time of actual rotation is supplied to the differential input signal 103. Thus, the difference between the noise component signal 104 and the signal that is the sum of the FG generation signal and noise component is obtained by the differential arithmetic unit 105, whereby the noise signal is cancelled out of the differential input signal 103 to get the motor rotation detection signal 106. As a result, detection of the target motor rotation is made possible without dependence upon exogenous noise even under conditions in which exogenous noise is applied.

Further, the positional relationship between the rotation detection signal generator 101 and the exogenous noise signal generator 102 will now be described. By way of example, the exogenous noise signal generator 102 is placed between a noise shield and the rotation detection signal generator 101. If it is determined that the signal level of exogenous noise is low under these conditions, then the exogenous noise signal generator 102 is not placed adjacent to the rotation detection signal generator 101 but is situated at a position where the exogenous noise will enter the rotation detection signal generator 101 without being blocked by the shield.

First Embodiment

Figure 2:
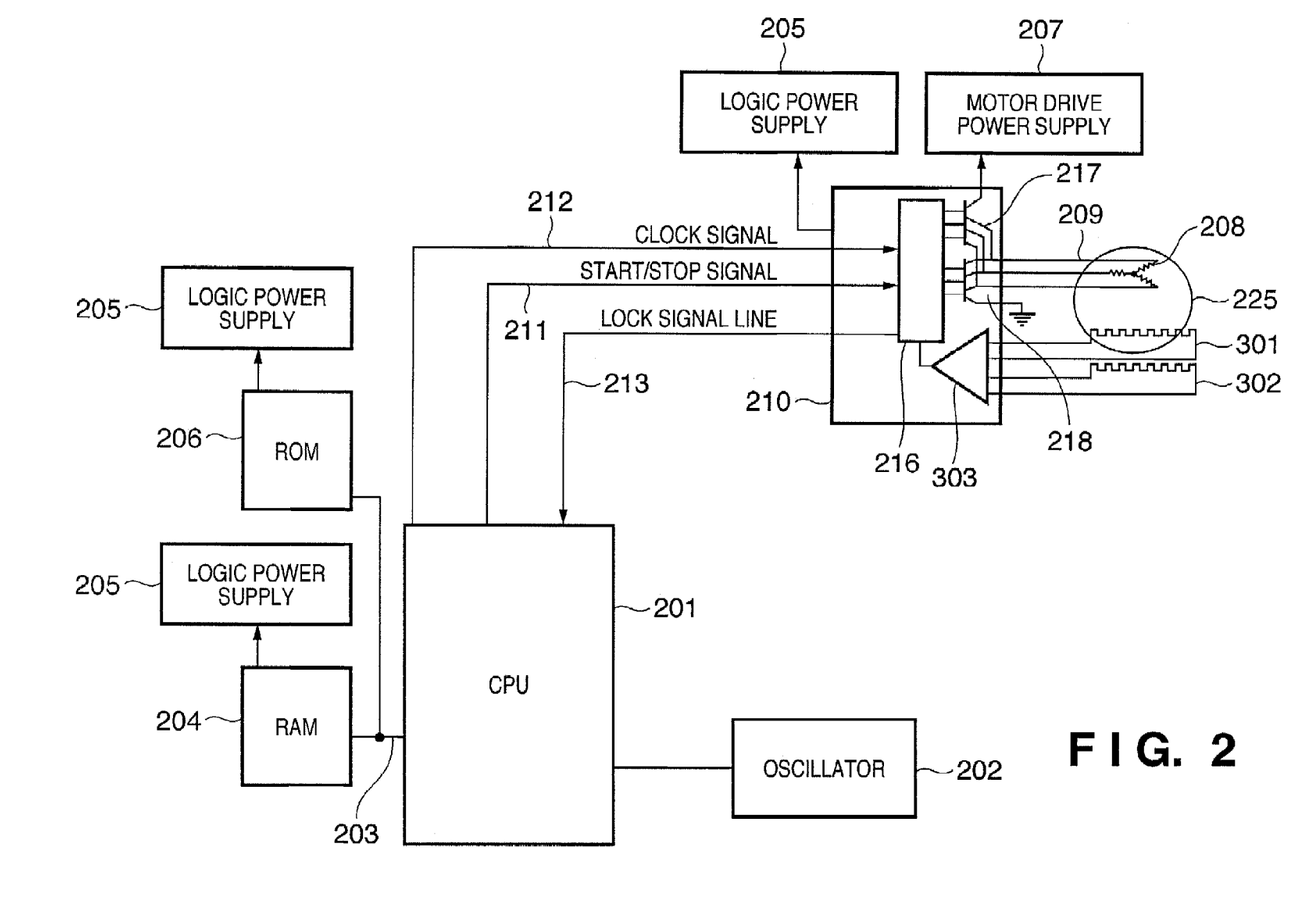
FIG. 2 is a block diagram illustrating the structure of a brushless motor control circuit according to an embodiment of the invention.

FIG. 2 is a block diagram illustrating the structure of a brushless motor control circuit according to an embodiment of the invention.

On the basis of a basic clock supplied from an oscillator 202, a CPU 201 operates in accordance with a control program that has been stored beforehand in a ROM 206. A bus 203 is a bus line for connecting the CPU 201 to the ROM 206 and RAM 204. The RAM 204 affords a work memory so that the CPU 201 may execute processing. A logic power supply 205 supplies electric power for operating each of the devices (parts).

When the brushless motor is controlled, the CPU 201 frequency-divides a reference clock from the oscillator 202 in accordance with the program in ROM 206 and outputs a clock signal 212 to a clock signal line. Further, the CPU 201 outputs a logic-level signal that starts or stops rotation of the motor 225 to a START/STOP signal line 211 connected to an internal port of the CPU 201. A motor driver unit 210 controls rotation of the motor 225 in accordance with a change in logic of the START/STOP signal line 211 and the frequency-divided clock that has been input as the clock signal 212. A motor speed control block 216 operates transistors 217 and 218 so that a current is passed into a winding 208 of the motor 225 to thereby rotate the motor 225. When the motor 225 is thus rotated, a voltage conforming to the rotational speed is induced in FG patterns 301, 302. The induced voltage is differentially amplified and wave-shaped by an FG amplifier 303 and fed back to the motor speed control block 216.

The motor speed control block 216 adjusts the ON time of the transistors 217 and 218 in such a manner that the fed-back output signal of the FG amplifier 303 and the clock signal will be synchronized. When synchronization of rotation of motor 225 thus falls within a period of a predetermined range, the motor speed control block 216 sends a LOCK signal (logic-change) to a LOCK signal line 213. A motor drive power supply 207 supplies electric power to the motor coil.

Figure 3:
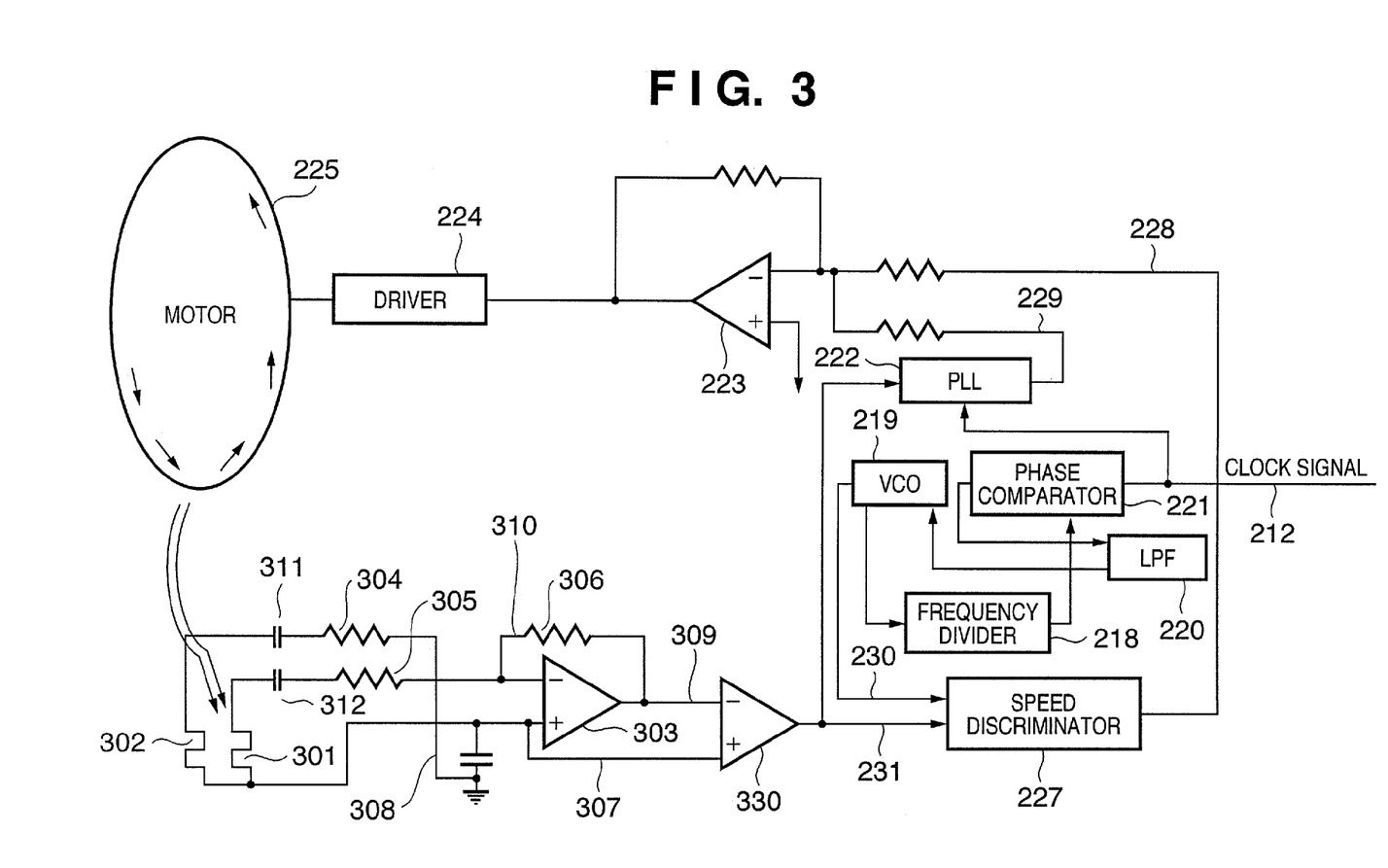
FIG. 3 is a block diagram for describing in further detail a speed control block of a motor driver unit according to the first embodiment.

FIG. 3 is a block diagram for describing in further detail the speed control block of the motor driver unit 210 according to the first embodiment.

When a rotor 400 (an outer rotor in this case; see FIG. 4) of the motor 225. A voltage is induced in the FG patterns 301, 302 in accordance with the period of rotation of the rotor 400. The voltage induced in the FG patterns 301, 302 is differentially amplified by the FG amplifier 303.

Figure 4:
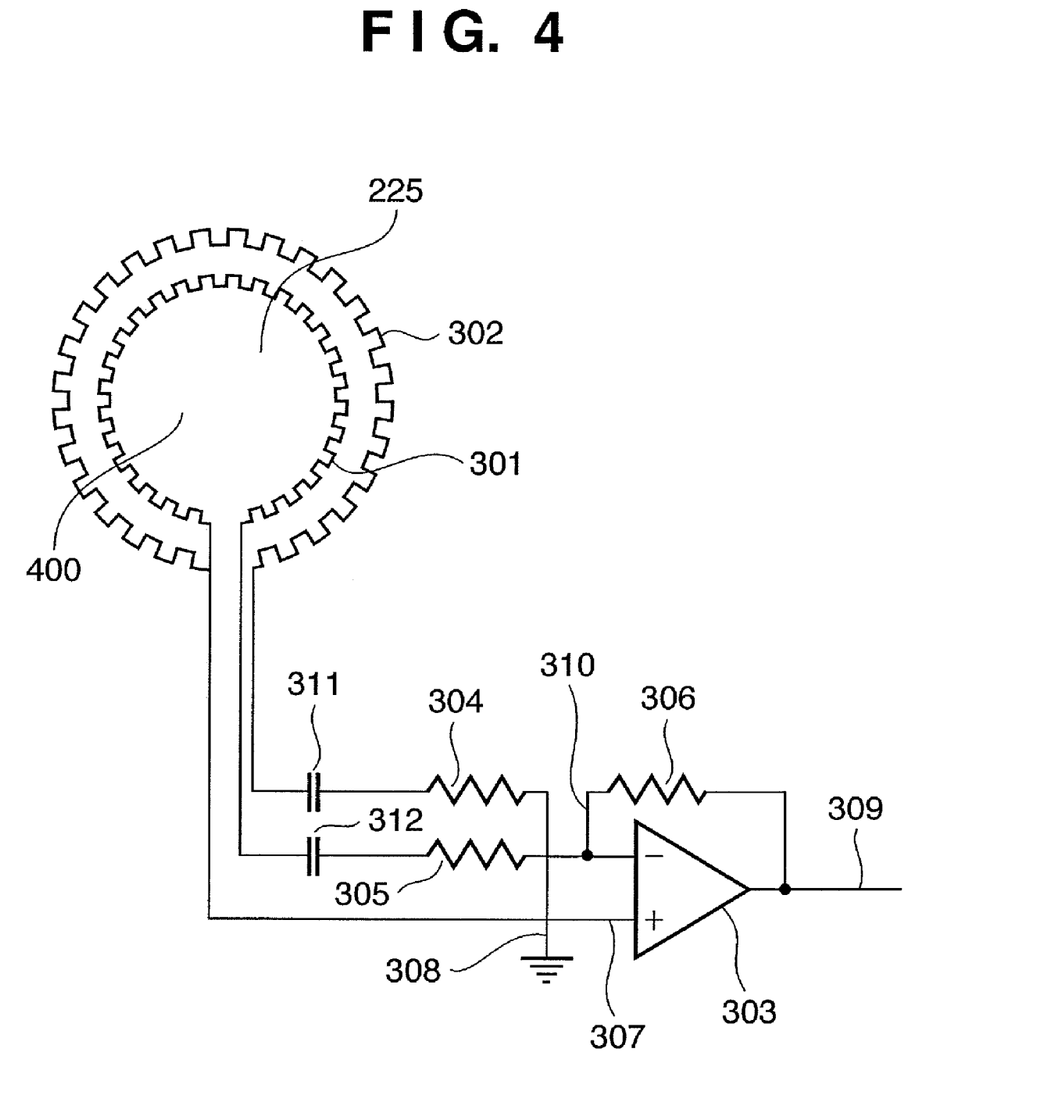
FIG. 4 is a diagram illustrating the positional relationship between first and second FG patterns and the rotor of a motor.

FIG. 4 is a diagram illustrating the positional relationship between the FG patterns 301, 302 and the rotor 400 of motor 225.

As shown in FIG. 4, the first FG pattern 301 is a trace pattern that has been printed on a printed board for sensing rotation of the rotor 400. The first FG pattern 301 is placed on a circle the diameter of which is approximately equal to the diameter of the rotor 400. Furthermore, in the first embodiment, the second FG pattern 302 is provided outside the first FG pattern 301. A voltage is induced in the first FG pattern 301 in accordance with rotation of the rotor 400, and a change in this induced voltage is amplified by the FG amplifier 303 and delivered to a speed discriminator 227 as a rotation-detection frequency signal.

A phase comparator 221 in FIG. 3 detects a phase difference between the clock signal 212 and output of a frequency divider 218 and causes a current to flow into an LPF 220. The phase-difference signal that has been output to the LPF 220 is converted to a direct current and the DC voltage is input to a VCO (voltage-controlled oscillator) 219. An internal clock signal 230 that will take on a predetermined frequency dividing ratio with respect to the externally applied clock signal 212 is subjected to feedback control by the VCO 219. In a case where the frequency of the clock signal 212 is changed, feedback control is applied is similar fashion to follow up the change in frequency and obtain the same frequency dividing ratio. The phases of the internal clock signal 230 that has been output from the VCO 219 and the FG detection signal 231 from a buffer amplifier 330 are compared by the speed discriminator 227, which outputs an acceleration/deceleration signal to a DOUT signal line 228. In a case where the period of the FG detection signal 231 is short with respect to the internal clock signal 230 (the frequency-multiplied external clock signal 212), it is judged that the rotational speed of the motor 225 is high and the difference relative to the internal clock signal 230 is output to the DOUT signal line 228 as a deceleration command. Conversely, in a case where the period of the FG detection signal 231 is long, the difference is output as an acceleration command.

A PLL 222 compares the phase of the FG detection signal 231 representing the detected motor rotation speed and the phase of the externally applied clock signal 212 and outputs the phase-difference information to a POUT signal line 229. In a case where the phase of the FG detection signal 231 is ahead of the phase of the external clock signal 212, the phase difference is output as a deceleration command. Further, if the phase of the FG detection signal 231 is lagging, then the difference is output as an acceleration signal. An integrating amplifier 223 integrates a speed error between the internal clock signal 230 obtained by the speed discriminator 227 and the FG detection signal 231 and the phase-difference signal between the external clock signal 212 output from the PLL 222 and the FG detection signal 231 and converts the result to a DC voltage. PWM ON duty is decided by this DC voltage obtained by the conversion. Speed control is thus performed by deciding the drive time of transistors in the driver 224 connected to three-phase windings within the motor 225.

In FIG. 4, the second FG pattern 302 is placed on the outer circle adjacent to the first FG pattern 301. The second FG pattern 302 is connected between a non-inverting input (+input) of the differential amplifier (FG amplifier) 303 and ground potential 308. If exogenous noise occurs, (exogenous noise voltage+motor rotation detection signal) is induced in the first FG pattern 301. Similarly, an exogenous noise voltage is induced in a common mode relative to ground in the second FG pattern 302. By inputting the induced exogenous noise voltage to the non-inverting input of the FG amplifier 303, the exogenous noise component can be subtracted from the voltage level of the first FG pattern 301.

As a result, the output of the FG amplifier 303 is solely the motor rotation signal also in a case where exogenous noise has occurred. The difference between the resistance values of resistors 304 and 305 changes depending upon the degree of adjacency of the first FG pattern 301 and 302 and is adjusted so as to become the exogenous noise level from the same point.

Further, in FIG. 3, capacitors 311, 312 are DC-cut capacitors of the first and second FG patterns 301, 302, respectively. The capacitors 311, 312 are connected to the resistors 304, 305, respectively.

Figure 5:
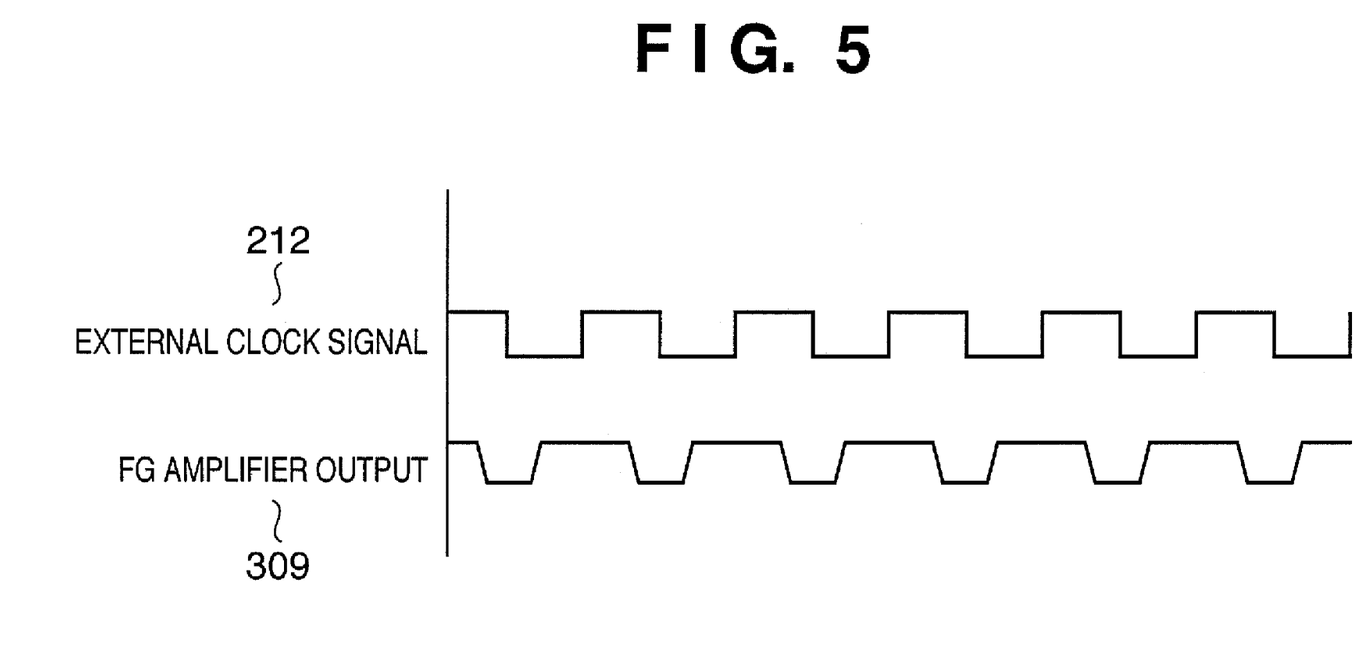
FIG. 5 is a diagram illustrating an external clock signal and the output waveform of an FG amplifier when a motor is rotating stably in the total absence of exogenous noise.

FIG. 5 is a diagram illustrating the external clock signal 212 and the output waveform of the FG amplifier 303 when the motor 225 is rotating stably in the total absence of exogenous noise.

Figure 6:
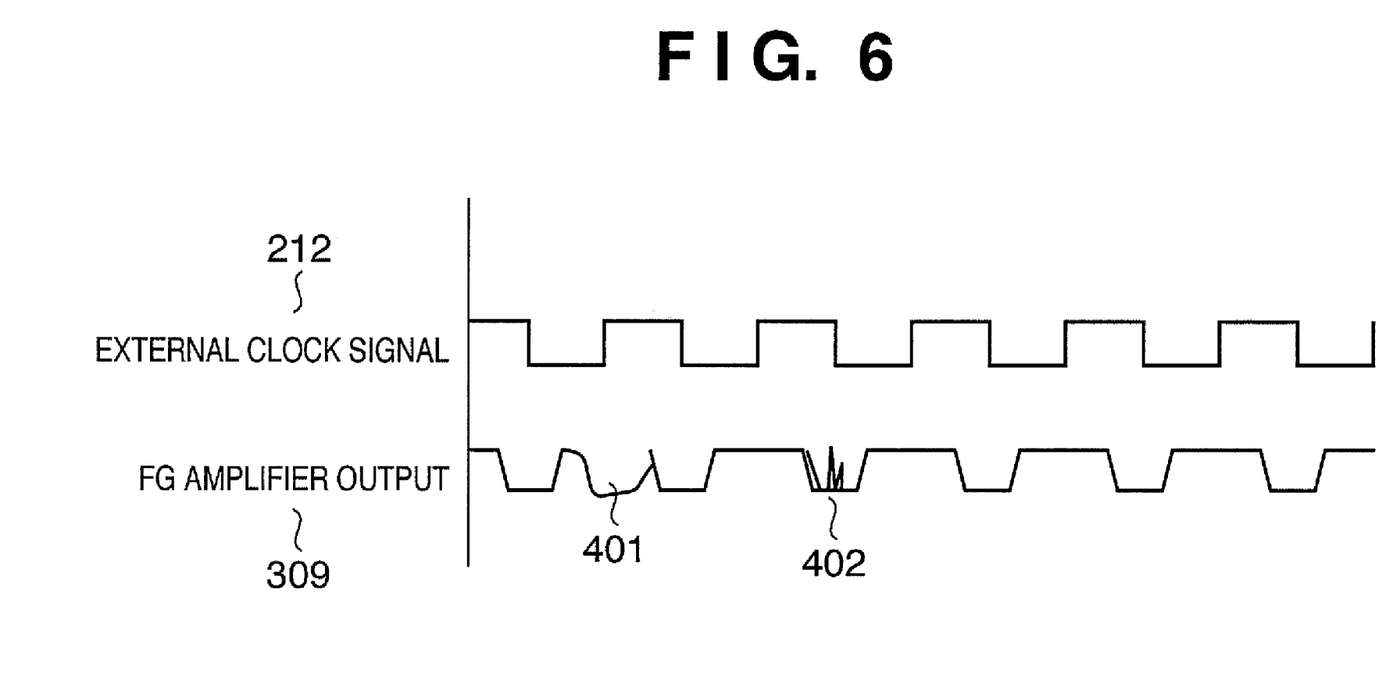
FIG. 6 is a diagram useful in describing the output of an FG amplifier in a case where exogenous noise is applied when use is made solely of a first FG pattern as in the prior art.

FIG. 6 is a diagram useful in describing the output of the FG amplifier 303 in a case where exogenous noise is applied when use is made solely of the first FG pattern as in the prior art.

In FIG. 6, reference numerals 401 and 402 indicate the effects of exogenous noise. The speed discriminator 227 and PLL controller 222 compare the periods and phases of the internal clock signal 230, which has been output from the VCO 219, and the external clock signal 212. Control is exercised so as to perform acceleration or deceleration by an amount equivalent to the exogenous noise components 401, 402 and achieve synchronization to the clock signal 212. However, in a case where noise is repeatedly applied or has been applied for a long period of time, control for achieving synchronization to the clock signal 212 is unable to keep up and the rotational speed of the motor 225 exceeds the fixed range. As a result, the LOCK signal line 213 (FIG. 2) becomes unlocked. If this situation arises, it will be judged that rotation of the motor 225 is abnormal, depending upon control of the device, the START/STOP signal 211 will be made STOP and this will lead to a state in which rotation of the motor 225 is halted.

Figure 7:
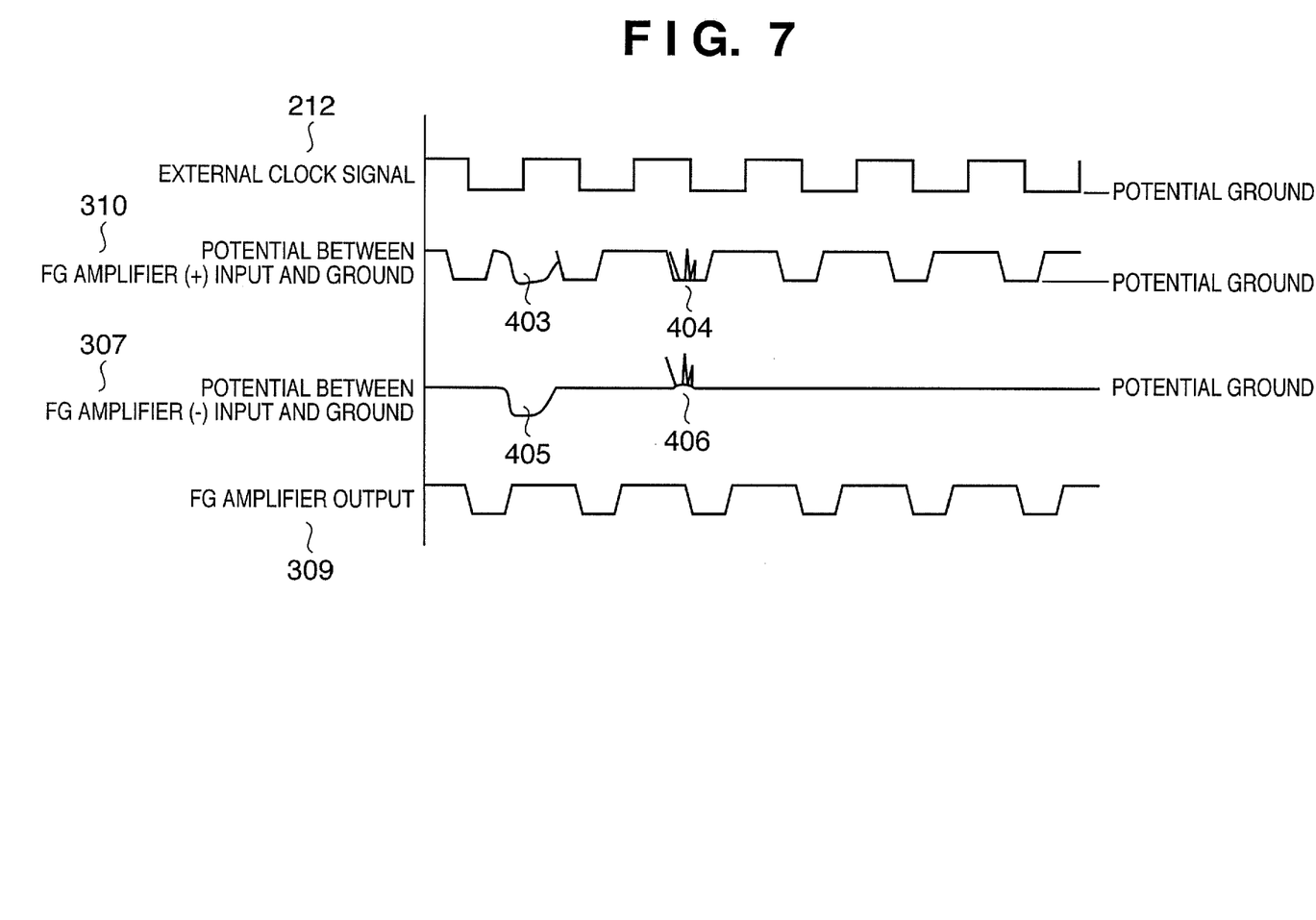
FIG. 7 is a diagram useful in describing an example in which a second FG pattern is input to a non-inverting input (+) terminal of an FG amplifier and common-mode noise with respect to ground is eliminated.

FIG. 7 is a diagram useful in describing an example in which the second FG pattern 302 is input to the non-inverting input (+) terminal of the FG amplifier 303 and common-mode noise with respect to ground is eliminated.

It is assumed that a motor rotation signal is generated between the input 310 of the FG amplifier 303 and ground in sync with the external clock signal 212, and that an exogenous noise signal of the kind shown at 403 or 404, for example, is being applied. At this time, however, a voltage is induced simultaneously between the second FG pattern 302 and ground at the inverting (−) input 307 of the FG amplifier 303, and the noise signal indicated at 405 or 406 is being impressed upon this voltage. As a result, the FG amplifier 303 takes the difference between these and eliminates noise, and hence can be eliminated as indicated by the output waveform 309 of the FG amplifier 303.

Furthermore, conventionally, exogenous noise is induced in the FG pattern and a noise component appears in the output of the FG amplifier, as a result of which the speed feedback system of the succeeding stage reacts with too much sensitivity. This may bring about a reaction in rotational speed or, alternatively, the logic power supply and the motor driving power supply may fluctuate owing to the exogenous noise. If the power-supply voltage thus fluctuates, a difference in offset potential that occurs at the +input and −input of the FG amplifier appears as an output difference of the FG amplifier. Consequently, an output that differs from the true output conforming to the rotor rotational speed that corresponds to the FG pattern is obtained and rotation of the motor becomes unstable.

However, in accordance with the motor driving circuit according to the first embodiment, the second FG pattern 302 fluctuates from ground by the percentage of the influence of noise as the common mode. By connecting the second FG pattern 302 to the +input of the FG amplifier 303, however, the power supply of the FG amplifier 303 and the +input and −input fluctuate in the common mode with ground being made common. As a result, the expected output of the FG amplifier 303 is approached and the apparatus becomes less susceptible to the effects of power-supply fluctuation due to exogenous noise.

It should be noted that the second FG pattern 302 cannot be placed at the affected position owing to rotation of the rotor of motor 225. Further, it is necessary to provide a fixed distance in such a manner that there will be no interference owing to electromagnetic induction from the first FG pattern 301.

Second Embodiment

Figure 8:
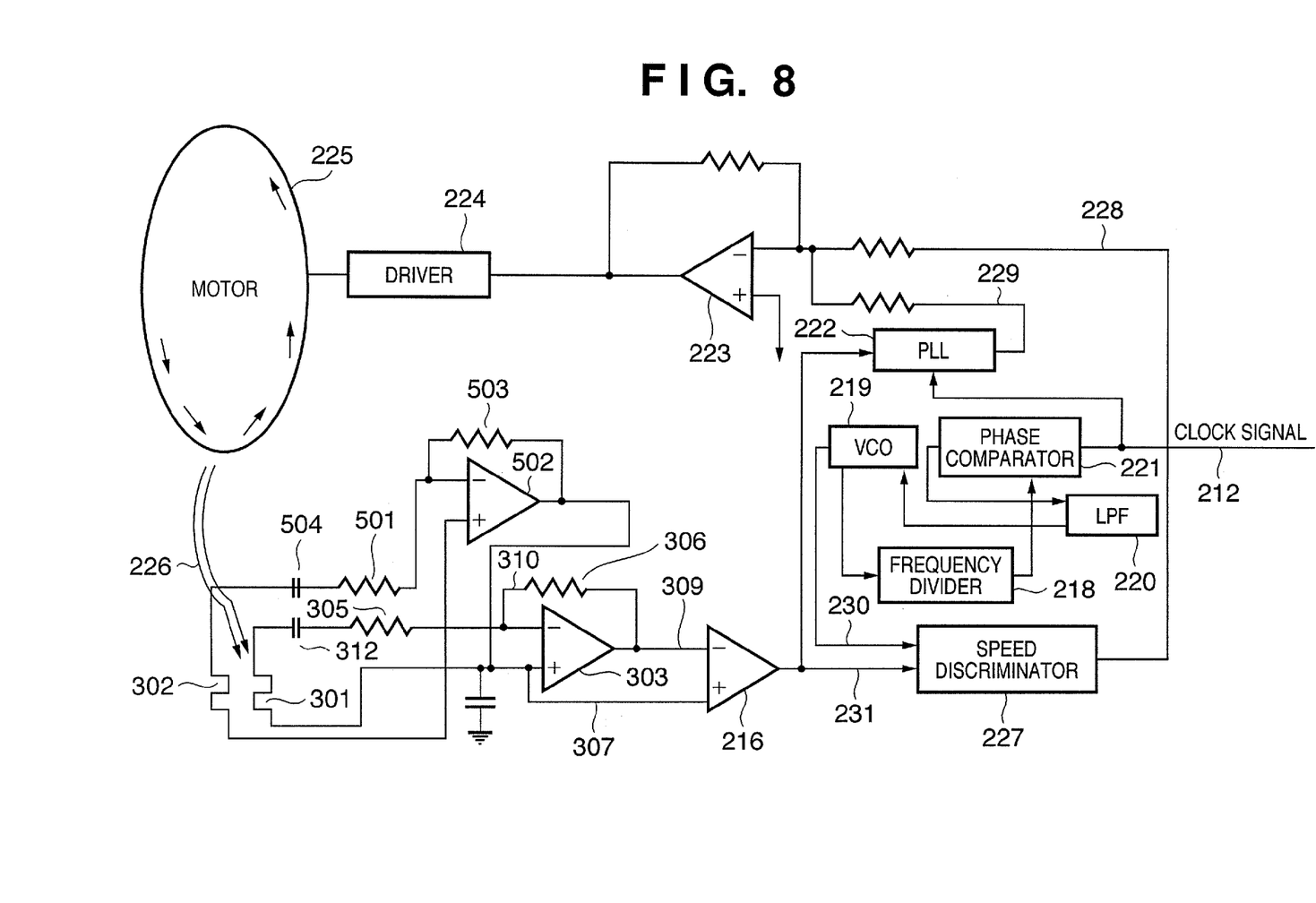
FIG. 8 is a block diagram for describing in further detail a speed control block of a motor driver unit according to a second embodiment of the present invention.

FIG. 8 is a block diagram for describing in further detail the speed control block of the motor driver unit 210 according to a second embodiment of the present invention. It should be noted that components identical with those in FIG. 3 are designated by like reference characters and need not be described again. Further, the control block of the brushless motor according to the second embodiment is the same as that in FIG. 2 and need not be described again.

The second embodiment differs from the first embodiment in that a second FG amplifier 502 is provided and the second FG pattern 302, a DC-cut capacitor 504 and a resistor 501 are connected between the (+) input and (−) input of the second FG amplifier 502. Furthermore, the second FG pattern 302 is input to the +terminal of the FG amplifier 303 via a feedback resistor 503. Thus the FG amplifier 303 eliminates common-mode noise between the second FG pattern 302 and first FG pattern 301. The operation of the other circuitry is similar to that of FIG. 3.

Figure 9:
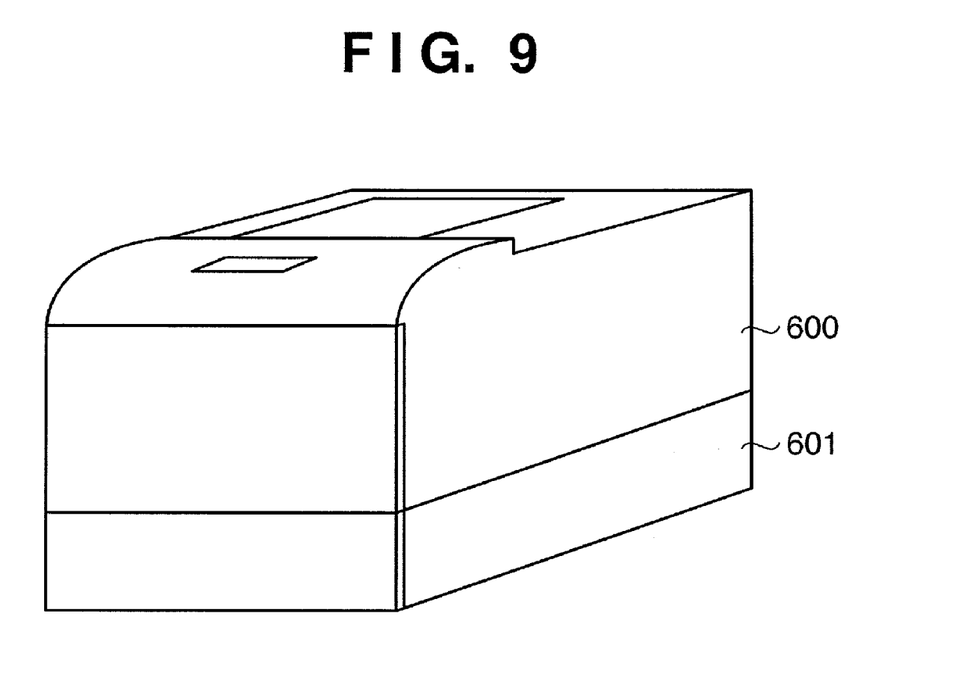
FIG. 9 depicts an external view of a printer according to a third embodiment of the present invention.

FIG. 9 depicts an external view of a printer according to a third embodiment.

Shown in FIG. 9 are a printer main body 600, which is an image forming apparatus, and a paper-feed cassette 601 containing papers fed to the main body 600.

Figure 10:
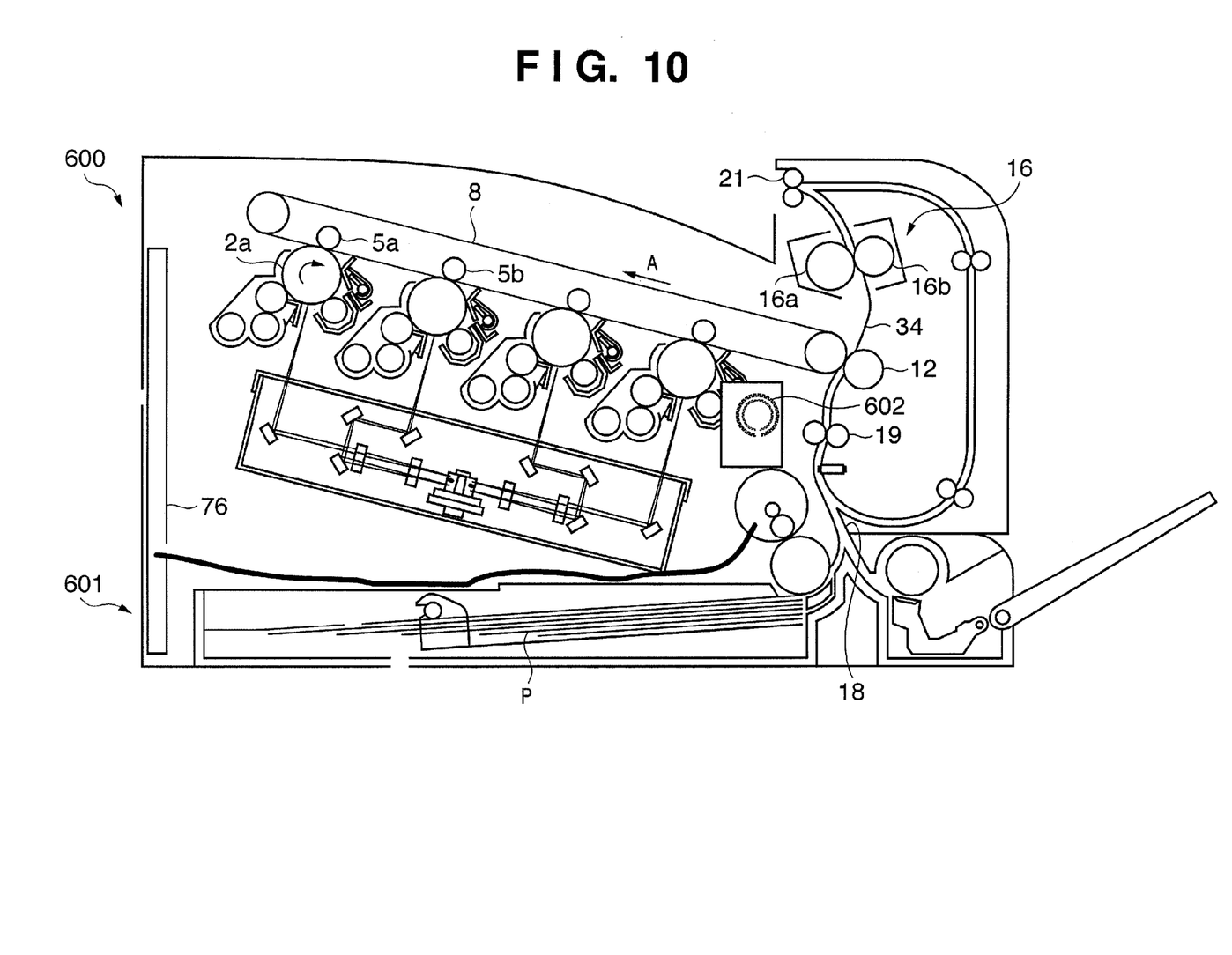
FIG. 10 depicts a sectional view useful in describing the structure of the printer according to the third embodiment.

FIG. 10 depicts a sectional view useful in describing the structure of the printer according to the third embodiment.

When an image-formation start signal is issued from a personal computer (PC) connected to a controller board 76 and imaging apparatus or a console (not shown) that is for the purpose of performing a copying operation, an operation to feed a paper from a selected cassette or manual-insertion tray is started. For example, a case in which a paper has been fed from the cassette will be described. First, a transfer medium P (paper) is fed from the cassette by a pick-up roller one sheet at a time. The transfer medium P is guided along a paper guide 18 and is transported to the position of a registration roller 19. At this time the registration roller 19 is at rest and the leading edge of the transfer medium P is in abutting contact with a nip portion of the registration roller 19. This is followed by starting rotation of the registration roller 19 based upon a timing signal at which the printer starts forming an image. At the time of such rotation, the timing is set in such a manner that the transfer medium P and a toner image transferred to an intermediate transfer belt 8 by primary transfer will coincide exactly in an area of secondary transfer.

When the signal for starting the image forming operation is issued, image forming sections form electrostatic latent images on drums of respective colors. The timing of image formation in the sub-scan direction is decided and controlled in accordance with the distance between image forming sections in order starting from a photosensitive drum (the Y drum in this embodiment) 2a that is farthest upstream in terms of the direction in which the intermediate transfer belt 8 rotates. With regard to write timing in the main-scan direction of each drum, a pseudo-BD sensor signal is generated and controlled using one BD sensor signal (placed at Bk in this embodiment) by operation control from a circuit (not shown). The electrostatic latent image thus formed is developed by the above-described process. The toner image that has been formed on the photosensitive drum 2a farthest upstream is transferred by primary transfer to the intermediate transfer belt 8 in a primary-transfer area by a primary-transfer charging unit 5a to which a high voltage has been applied. The primary-transferred toner image is transported to a primary-transfer charging unit 5b. Image formation is performed upon a delay equivalent to the toner-image transport time between the image forming sections based upon the above-described timing signal. The toner image is registered on the preceding image and the next toner image is transferred on the preceding image. The same process is repeated from this point onward until the toner images of all four colors (Yellow, Magenta, Cyan and Black) are finally transferred to the intermediate transfer belt 8 by primary transfer.

The transfer medium P thenceforth advances to a secondary-transfer area (secondary-transfer rollers 12) and contacts the intermediate transfer belt 8, and a high voltage is applied to the secondary-transfer rollers 12 in conformity with the timing at which the transfer medium P passes by. The four toner images formed on the intermediate transfer belt 8 by the above-described process are transferred to the surface of the transfer medium P (secondary transfer). After the secondary transfer, the transfer medium P is guided accurately to the nip of fixing rollers of a fixing unit 16 by a transport guide 34. The toner images are fixed to the transfer medium P by heat and by pressure at the nip in the fixing unit 16 having a fixing film 16a and a pressure roller 16b. The transfer medium P subsequently is transported by external discharge rollers 21 and is discharged to the exterior of the apparatus to end this series of image forming operations.

In the third embodiment, the photosensitive drums are disposed in the order yellow, magenta, cyan and black from the upstream side. However, this arrangement is decided by the characteristics of the apparatus and does not constitute a limitation.

The brushless motor unit according to this embodiment is disposed as indicated at 602 in FIG. 10. The brushless motor unit 602 has a printed board on which the first FG pattern 301 is printed as well as the second FG pattern 302, which is outside the contour of the first FG pattern 301. Furthermore, the printer body 600 has a control circuit for rotating the motor. As illustrated in FIG. 2, the clock signal 212 and START/STOP signal line 211 are supplied from a CPU (not shown) on the controller board 76 and are delivered to the LOCK signal line 213. Here the rotor of the motor 225 is present on the first FG pattern 301. In this configuration, effects equivalent to those of the first and second embodiments are obtained so long as the surroundings of the brushless motor unit 602 are not covered with a shield. Further, the sequence and effects in this case are similar to those of the first embodiment.

In accordance with the embodiments, as described above, rotation of a brushless motor can be stabilized with respect to exogenous noise. Further, noise can be dealt with at low cost merely by adding on an FG pattern adjacent to the conventional FG pattern. As a result, it is possible to reduce the cost of the equipment per se.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-262975, filed on Sep. 9, 2005, which is hereby incorporated by reference herein in its entirety.

What is claimed is:

1. A motor control apparatus comprising:
   a rotation signal generator configured to generate a first induced voltage attendant upon rotation of a rotor of a motor;
   a noise signal generator arranged adjacent to said rotational signal generator and configured to generate a second induced voltage due to noise independent from the rotation of the rotor;
   a differential amplifier configured to differentially amplify the first and second induced voltages, which are input thereto; and
   a motor rotation control unit configured to control rotation of the motor so as to achieve synchronization between the output of the differential amplifier and a prescribed frequency signal,
   wherein said differential amplifier subtracts the second induced voltage from the first induced voltage to output a signal in which the noise has been removed.

2. The apparatus according to claim 1, wherein the rotation signal generator includes a first FG pattern configured to induce the first induced voltage in sync with rotation of the rotor.

3. The apparatus according to claim 2, wherein the noise signal generator includes a second FG pattern configured to induce the second induced voltage independent of rotation of the rotor.

4. The apparatus according to claim 3, wherein the first and second FG patterns are laid out on the same board.

5. The apparatus according to claim 1, wherein the motor is a brushless motor.

6. The apparatus according to claim 1, wherein said motor rotation control unit includes a PLL circuit, which receives the prescribed frequency signal and the output of differential amplifier as input signals thereto, and performs PLL control.

7. The apparatus according to claim 2, wherein the rotation signal generator includes a DC-cut capacitor and a resistor for adjusting gain of said differential amplifier.

8. The apparatus according to claim 3, wherein the noise signal generator includes a DC-cut capacitor and a resistor for adjusting gain of said differential amplifier or level of the second induced voltage.

9. The apparatus according to claim 1, further comprising an amplifier configured to amplify the second induced voltage at a stage preceding said differential amplifier.

10. The apparatus according to claim 1, wherein said rotation signal generator includes a first FG pattern configured to induce the first induced voltage in sync with rotation of the motor, and said noise signal generator includes a second FG pattern configured to induce the second induced voltage independent of rotation of the rotor, and wherein the second FG pattern is positioned outside of and substantially surrounding the first FG pattern.

11. The apparatus according to claim 10, wherein the first and second FG patterns are laid out on a same board.

* * * * *